United States Patent
Nishiyama et al.

(10) Patent No.: US 9,365,202 B2
(45) Date of Patent: Jun. 14, 2016

(54) VEHICLE CONTROL SYSTEM FOR CONTROLLING HEAT EXCHANGE BETWEEN A MOTOR AND A TRANSMISSION

(71) Applicant: DENSO CORPORATION, Kariya, Aichi-pref. (JP)

(72) Inventors: Masaki Nishiyama, Owariasahi (JP); Youhei Morimoto, Nagoya (JP); Yutaro Itoh, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/633,613

(22) Filed: Feb. 27, 2015

(65) Prior Publication Data

US 2015/0251650 A1  Sep. 10, 2015

(30) Foreign Application Priority Data

Mar. 10, 2014  (JP) .................................. 2014-46900

(51) Int. Cl.
| | |
|---|---|
| *B60L 9/00* | (2006.01) |
| *B60W 10/10* | (2012.01) |
| *B60W 10/06* | (2006.01) |
| *B60W 10/08* | (2006.01) |
| *B60K 6/48* | (2007.10) |
| *B60W 30/194* | (2012.01) |

(52) U.S. Cl.
CPC .................. *B60W 10/10* (2013.01); *B60K 6/48* (2013.01); *B60W 10/06* (2013.01); *B60W 10/08* (2013.01); *B60W 20/15* (2016.01); *B60W 30/194* (2013.01); *B60K 2006/4825* (2013.01); *B60W 2510/107* (2013.01); *B60W 2710/1005* (2013.01); *Y02T 10/52* (2013.01); *Y02T 10/6221* (2013.01); *Y02T 10/6286* (2013.01); *Y02T 10/7077* (2013.01); *Y02T 10/7275* (2013.01)

(58) Field of Classification Search
None
See application file for complete search history.

(56) References Cited

U.S. PATENT DOCUMENTS

| | | | | |
|---|---|---|---|---|
| 5,600,557 A | * | 2/1997 | Ogawa | F16H 61/66254 477/115 |
| 2008/0297073 A1 | * | 12/2008 | Yatabe | B60K 6/365 318/51 |
| 2010/0078238 A1 | * | 4/2010 | Oba | B60K 6/40 180/65.225 |
| 2010/0147610 A1 | * | 6/2010 | Katsuta | B60K 6/365 180/65.265 |

FOREIGN PATENT DOCUMENTS

JP  2002-176794  6/2002

* cited by examiner

*Primary Examiner* — Adam Alharbi
(74) *Attorney, Agent, or Firm* — Nixon & Vanderhye P.C.

(57) ABSTRACT

When a request of a warming-up of a transmission is generated, a hybrid ECU sets a target input rotational speed of the transmission where a heat loss quantity of a MG becomes maximum, based on a request driving force of a vehicle. In this case, the heat loss quantity is a quantity of a heat loss causing an increasing of a temperature of an ATF in the MG. Thus, the hybrid ECU sets the target input rotational speed where the heat loss quantity becomes maximum and controls the transmission and the MG to output power that meets the request driving force of the vehicle. Since the hybrid ECU controls a torque of the MG, a torque of the engine, and a transmission ratio of the transmission to achieve the target input rotational speed, the hybrid ECU controls the MG, the engine, and the transmission in a condition that the heat loss quantity becomes maximum.

3 Claims, 5 Drawing Sheets

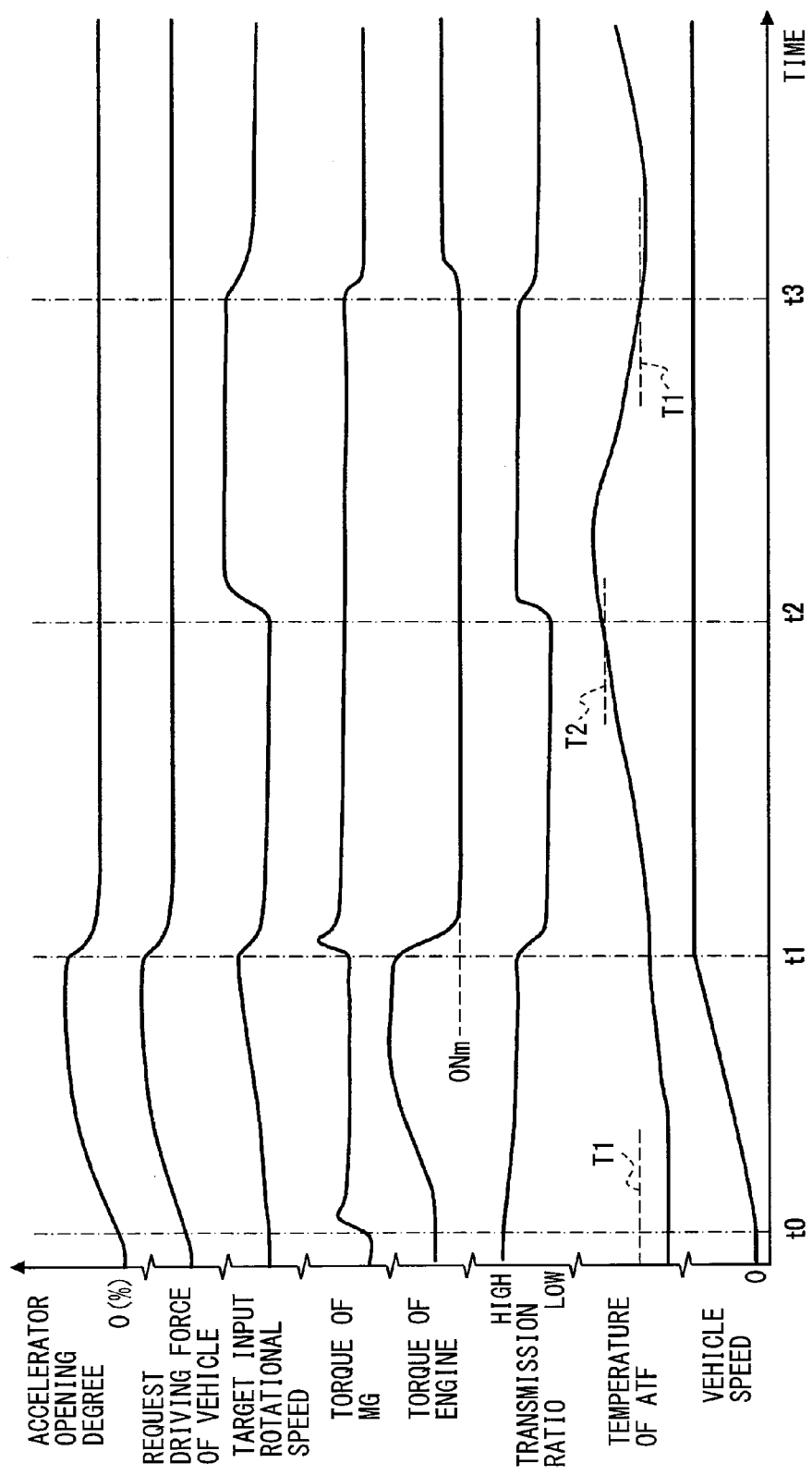

VEHICLE CONTROL SYSTEM FOR CONTROLLING HEAT EXCHANGE BETWEEN A MOTOR AND A TRANSMISSION

CROSS REFERENCE TO RELATED APPLICATION

This application is based on Japanese Patent Application No. 2014-46900 filed on Mar. 10, 2014, the disclosure of which is incorporated herein by reference.

TECHNICAL FIELD

The present disclosure relates to a vehicle control system which performs a heat exchange between a lubricating oil of a transmission and a motor.

BACKGROUND

Since a viscosity of a lubricating oil (operation oil) of a transmission is high before a warming-up of the transmission that is mounted to a vehicle is completed, an efficiency of a power transmission of the transmission is reduced, and a fuel consumption of the vehicle is deteriorated. In this case, the transmission is an automatic transmission.

According to JP-2002-176794A, a technology is disclosed to accelerate the warming-up of the transmission to suppress a deterioration of the fuel consumption, in a hybrid vehicle provided with an engine and a motor which are used as power sources of the hybrid vehicle. Specifically, the transmission is placed at a position in the vicinity of the motor. When a temperature of the lubricating oil of the transmission is less than a predetermined value, a driving force of the engine is reduced, and a driving force of the motor is increased. Therefore, a heat generation quantity of the motor is increased to increase the temperature of the lubricating oil.

However, a heat loss of the motor and the transmission is not completely contributed to an increasing of the temperature of the lubricating oil, and a part of the heat loss is discharged to external. Therefore, even though the heat generation quantity of the motor is increased, when a quantity of the heat loss causing the increasing of the temperature of the lubricating oil is small, the temperature of the lubricating oil cannot be efficiently increased.

According to JP-2002-176794A, since only the driving force of the motor is increased to increase the heat generation quantity of the motor, the temperature of the lubricating oil may be insufficiently increased. Thus, an accelerated effect of the increasing of the temperature of the lubricating oil and a suppressed effect of the deterioration of the fuel consumption cannot be sufficiently improved.

SUMMARY

It is an object of the present disclosure to provide a vehicle control system in which a temperature of a lubricating oil of a transmission can be sufficiently increased and an acceleration of an increasing of the temperature of the lubricating oil and a suppression of a deterioration of a fuel consumption can be balanced.

According to an aspect of the present disclosure, a vehicle control system includes the motor mounted to a vehicle, the transmission mounted to the vehicle, and a control portion. The control portion sets a target input rotational speed of the transmission where a quantity of heat loss causing an increasing of a temperature of the lubricating oil becomes maximum at least in the motor between the motor and the transmission, based on a request driving force of the vehicle of when a request of a warming-up of the transmission is generated. The control portion controls the motor and the transmission to obtain an input rotational speed of the transmission equal to the target input rotational speed, so as to perform a heat exchange between a lubricating oil of a transmission and a motor.

In a system performing a heat exchange between a lubricating oil of a transmission and a motor, a quantity of a heat loss causing an increasing of a temperature of the lubricating oil in the motor or the transmission varies according to a driving force of a vehicle or an input rotational speed of the transmission.

According to the present disclosure, when the request of the warming-up of the transmission is generated, the target input rotational speed of the transmission in which the quantity of the heat loss causing the increasing of the temperature of the lubricating oil becomes maximum, based on the request driving force of the vehicle. Therefore, the target input rotational speed where the quantity of the heat loss causing the increasing of the temperature of the lubricating oil becomes maximum, and the transmission and the motor are controlled to output power that meets the request driving force of the vehicle. Since the motor and the transmission are controlled to achieve the target input rotational speed, the motor and the transmission can be controlled in a condition that the quantity of the heat loss becomes maximum. Thus, the temperature of the lubricating oil of the transmission can be sufficiently increased, and the acceleration of the increasing of the temperature of the lubricating oil and the suppression of the deterioration of the fuel consumption can be balanced.

BRIEF DESCRIPTION OF THE DRAWINGS

The above and other objects, features and advantages of the present disclosure will become more apparent from the following detailed description made with reference to the accompanying drawings. In the drawings:

FIG. 5 is a time chart showing an example of executing the temperature increasing control.

DETAILED DESCRIPTION

Figure 1:
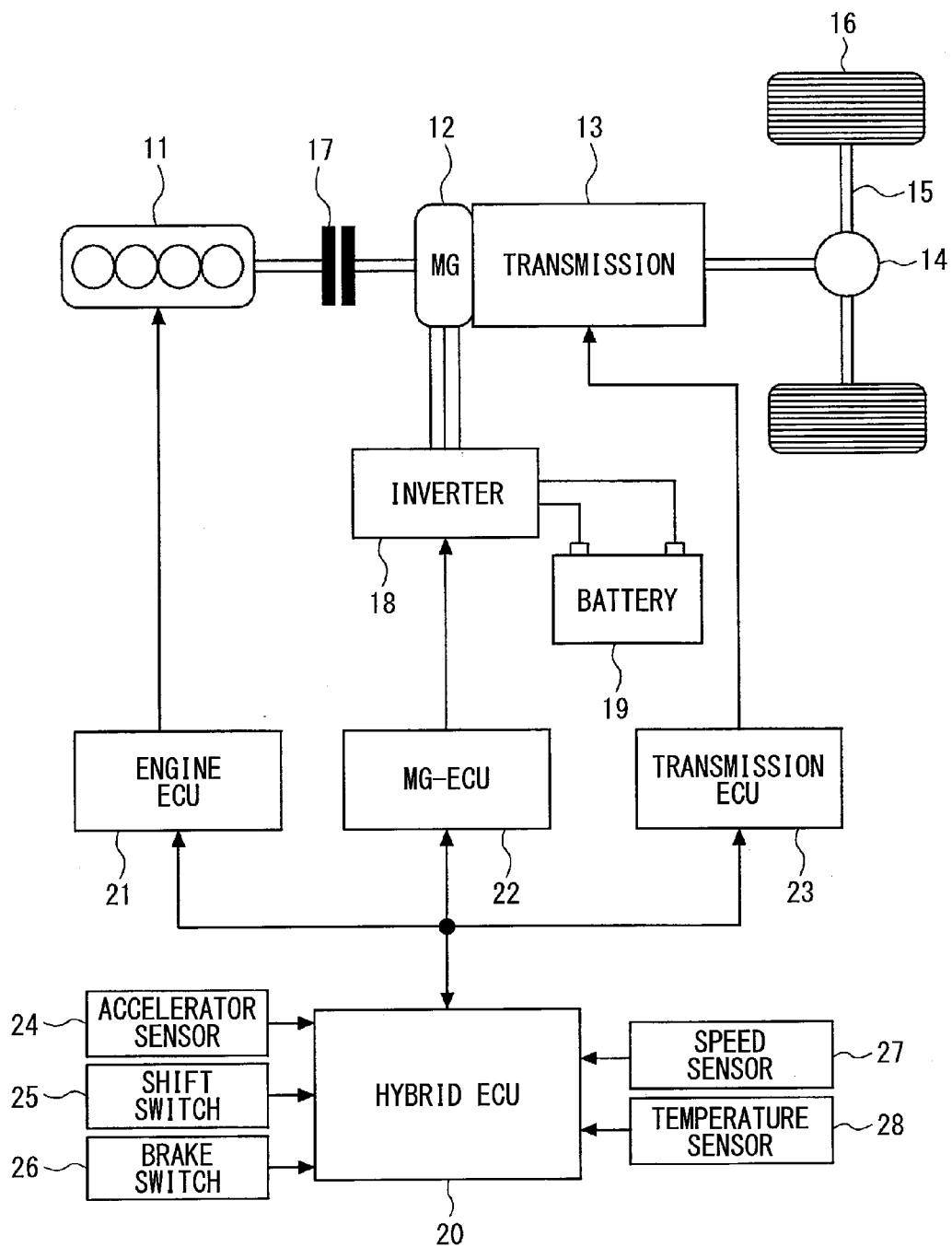
FIG. 1 is a diagram showing an outline of a driving control system of a hybrid vehicle according to an embodiment of the present disclosure.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

Hereafter, an embodiment of the present disclosure will be detailed.

First, an outline of a driving control system of a hybrid vehicle will be described with reference to FIG. 1.

The driving control system is provided with an engine 11 corresponding to an internal combustion engine and a motor generator 12 as power sources of the hybrid vehicle. According to the present embodiment, the motor generator 12 is referred to as a MG 12. Hereafter, the hybrid vehicle is referred to as a vehicle. In addition, the MG 12 also corresponds to a motor in the present embodiment. A power of an output shaft of the engine 11 is transmitted to a transmission 13 through the MG 12, and a power of an output shaft of the transmission 13 is transmitted to a wheel 16 through a differential gear mechanism 14 and an axle 15. According to the embodiment, the output shaft of the engine 11 is a crank shaft. The transmission 13 is a continuously variable transmission (CVT) which steplessly changes. According to the present embodiment, the driving control system is a vehicle control system.

In a power transmission system where the power of the engine 11 is transmitted to the wheel 16, a rotational shaft of the MG 12 is placed at a position between the engine 11 and the transmission 13 to perform power transmission. A clutch 17 is placed at a position between the engine 11 and the MG 12 to interrupt or allow the power transmission. The clutch 17 may be a hydraulic clutch which is driven by an oil pressure, or may be an electromagnetic clutch which is driven by an electromagnetic force. An inverter 18 driving the MG 12 is connected with a battery 19. An electric power transfers between the MG 12 and the battery 19 through the inverter 18.

A lubricating oil of the transmission 13 is used as an operation oil to activate the transmission 13. According to the present embodiment, the lubricating oil is an automatic transmission fluid (ATF). The MG 12 is placed at a position in the vicinity of the transmission 13 to perform a heat exchange between the ATF and the MG 12.

A temperature of the ATF is detected by a temperature sensor 28. An accelerator sensor 24 detects an accelerator opening degree corresponding to an operation amount of an accelerator pedal. A shift switch 25 detects an operation position of a shift lever. A brake switch 26 detects a brake operation, or a brake sensor detects a brake operation amount. A speed sensor 27 detects a vehicle speed.

A hybrid ECU 20 is a computer controlling the entire vehicle. The hybrid ECU 20 loads output signals from the above various sensors and switches, and then detects an operation state of the vehicle. The hybrid ECU 20 sends and receives control signals and data signals between an engine ECU 21 which controls the engine 11, a MG-ECU 22 which controls the MG 12 by controlling the inverter 18, and a transmission ECU 23 which controls the transmission 13 and the clutch 17, and controls the engine 11, the MG 12, the transmission 13, and the clutch 17 according to the operation state of the vehicle detected by the engine ECU 21, the MG-ECU 22, and the transmission ECU 23.

The hybrid ECU 20 executes a travelling-mode switching routine according to the operation state of the vehicle, so as to switch a travelling mode of the vehicle between a HV mode and an EV mode. In this case, the operation state includes a request driving force of the vehicle and a state of charge in the battery 19. In the HV mode, the clutch 17 is locked, and the wheel 16 is driven at least by the power of the engine 11. Specifically, in the HV mode, the wheel 16 may be driven only by the power of the engine 11, or may be driven by both the power of the engine 11 and a power of the MG 12. In the EV mode, the clutch 17 is released, and the wheel 16 is driven only by the power of the MG 12. In this case, a combustion of the engine 11 is stopped, and the wheel 16 is driven by the power of the MG 12.

According to the present embodiment, the hybrid ECU 20 performs a temperature increasing control routine to execute a temperature increasing control to accelerate a warming-up of the transmission 13. In this case, the temperature of the ATF is increased. When a request of the warming-up of the transmission 13 is generated, the hybrid ECU 20 sets a target input rotational speed of the transmission 13 based on the request driving force of the vehicle. In this case, a heat loss quantity of the MG 12 becomes maximum, and a request of increasing the temperature of the ATF is generated. Further, the heat loss quantity is a quantity of heat loss causing an increasing of the temperature of the ATF in the MG 12. The hybrid ECU 20 controls the MG 12, the engine 11, and the transmission 13 to achieve the target input rotational speed. In this case, an input rotational speed of the transmission 13 is equal to the target input rotational speed. In other words, the hybrid ECU 20 controls the MG 12 and the transmission 13 to obtain the input rotational speed of the transmission 13 equal to the target input rotational speed.

In a system performing the heat exchange between the ATF and the MG 12, the quantity of heat loss causing to the increasing of the temperature of the ATF in the MG 12 or the transmission 13 varies according to a driving force of the vehicle or the input rotational speed of the transmission 13.

According to the present embodiment, when the request of the warming-up of the transmission 13 is generated, since the hybrid ECU 20 sets the target input rotational speed of the transmission 13 in which the heat loss quantity of the MG 12 becomes maximum based on the request driving force of the vehicle, the hybrid ECU 20 sets the target input rotational speed where the heat loss quantity becomes maximum and controls the transmission 13 and the MG 12 to output power that meets the request driving force of the vehicle. Since the hybrid ECU 20 controls the MG 12, the engine 11, and the transmission 13 to achieve the target input rotational speed, the hybrid ECU 20 controls the MG 12, the engine 11, and the transmission 13 in a condition that the heat loss quantity becomes maximum.

Figure 2:
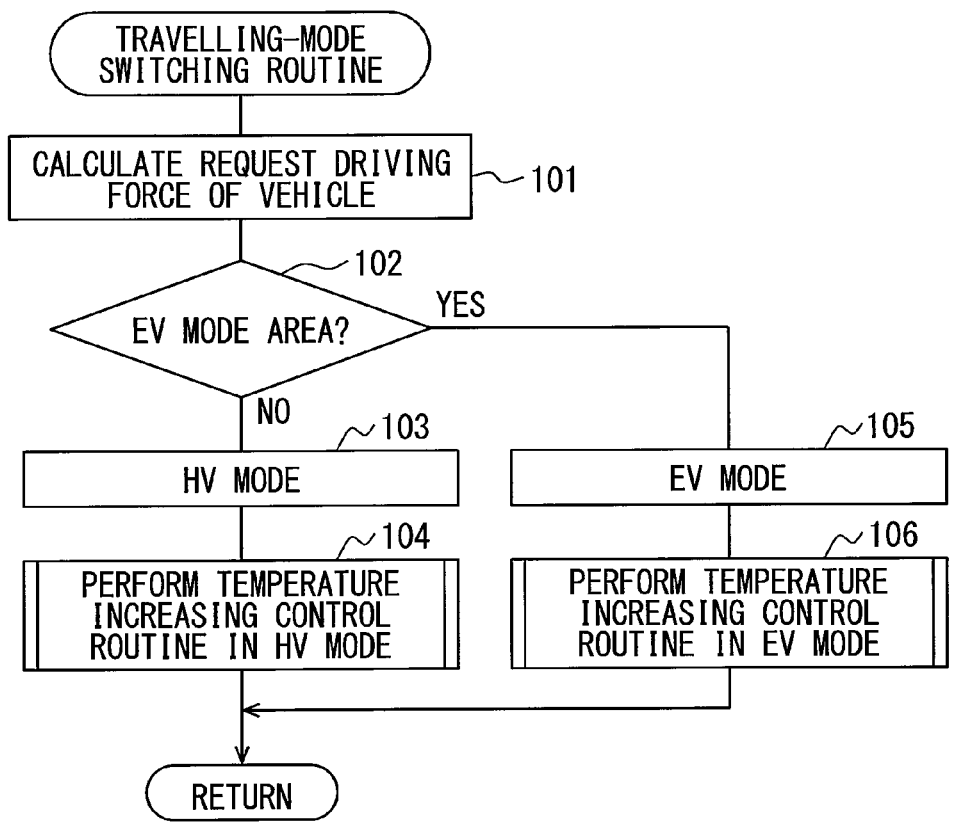
FIG. 2 is a flowchart showing a travelling-mode switching routine.

As shown in FIG. 2, when the hybrid ECU 20 is turned on, the travelling-mode switching routine is repeatedly performed at a predetermined period. According to the present embodiment, the traveling-mode switching routine corresponds to a control portion. At 101, the hybrid ECU 20 calculates the request driving force of the vehicle by a map or a formula, based on the accelerator opening degree and the vehicle speed or based on the accelerator opening degree and the input rotational speed of the transmission 13.

At 102, the hybrid ECU 20 determines whether the vehicle operates in an EV mode area. Specifically, the hybrid ECU 20 determines whether the request driving force of the vehicle is less than or equal to a first reference value alpha or determines whether a battery SOC is greater than or equal to a second reference value beta, so as to determine whether the vehicle operates in the EV mode area. According to the present embodiment, the battery SOC is the state of charge in the battery 19.

When the temperature of the ATF is less than a first predetermined value T0, a determination condition of switching the travelling mode of the vehicle between the HV mode and the EV mode is changed to expand the EV mode area. According to the present embodiment, the determination condition is a condition that determines whether the vehicle operates in the EV mode area. Specifically, when the temperature of the ATF is greater than or equal to the first predetermined value T0, the hybrid ECU 20 sets a first threshold alpha1 to the first determination value alpha. When the temperature of the ATF is less than the first predetermined value T0, the hybrid ECU 20 sets a second threshold alpha2 to the first determination value alpha. The second threshold alpha2 is greater than the first threshold alpha1. Alternatively, when the temperature of the ATF is greater than or equal to the first predetermined value T0, the hybrid ECU 20 sets a third threshold beta1 to the second determination value beta. When the temperature of the ATF is less than the first predetermined value T0, the hybrid ECU 20 sets a fourth threshold beta2 to the second determination value beta. The fourth threshold beta2 is less than the third threshold beta1.

When the hybrid ECU 20 determines that the vehicle is not operating in the EV mode area but in a HV mode area at 102, the hybrid ECU 20 proceeds to 103. At 103, the hybrid ECU 20 switches the travelling mode of the vehicle to the HV mode or maintains the travelling mode of the vehicle to be the HV mode.

At 104, the hybrid ECU 20 performs the temperature increasing control routine in the HV mode to execute the temperature increasing control in a case where the request of the warming-up of the transmission 13 is generated.

When the hybrid ECU 20 determines that the vehicle is operating in the EV mode area at 102, the hybrid ECU 20 proceeds to 105. At 105, the hybrid ECU 20 switches the travelling mode of the vehicle to the EV mode or maintains the travelling mode of the vehicle to be the EV mode.

At 106, the hybrid ECU 20 performs the temperature increasing control routine in the EV mode to execute the temperature increasing control in a case where the request of the warming-up of the transmission 13 is generated.

Figure 3:
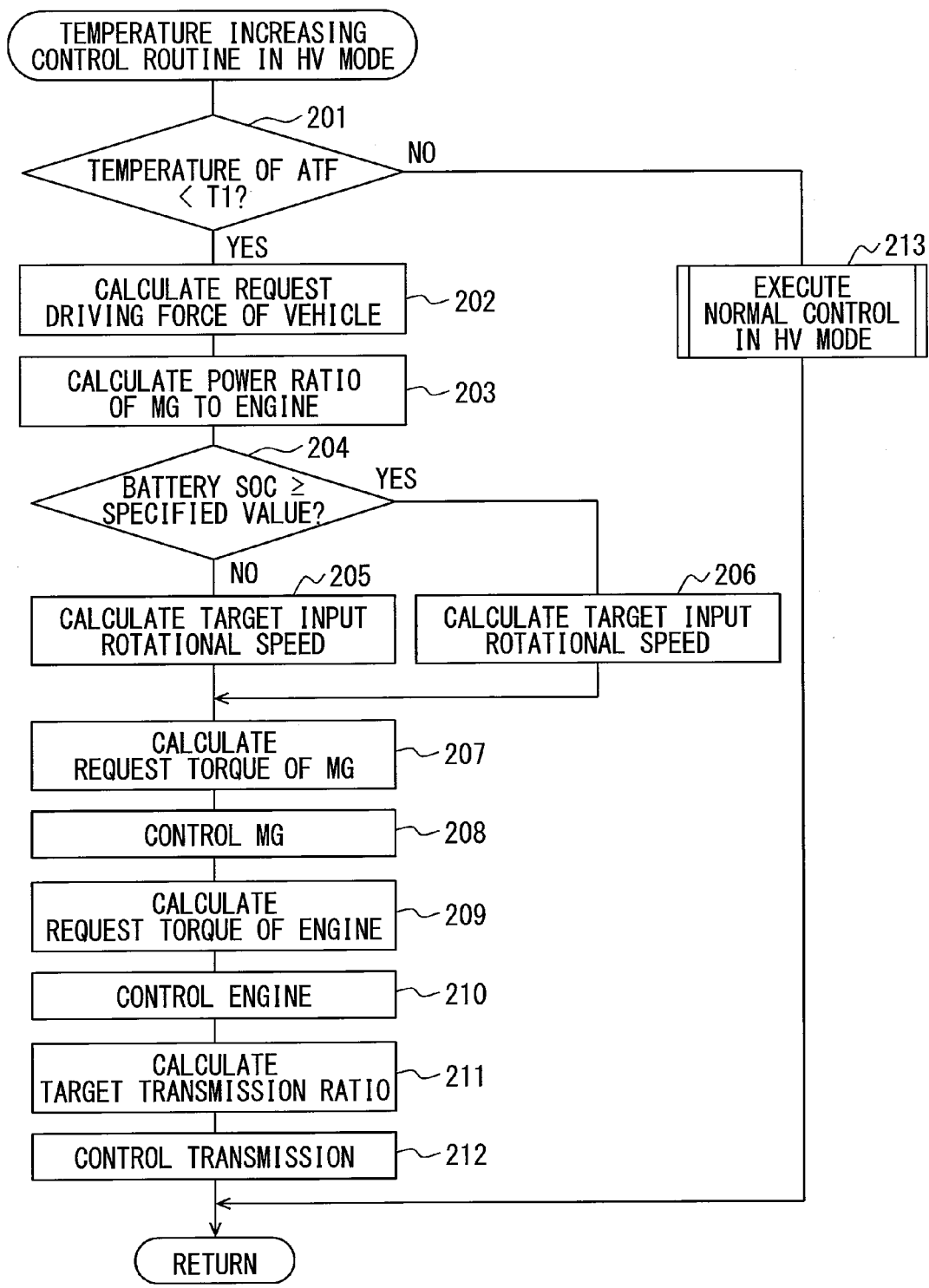
FIG. 3 is a flowchart showing a temperature increasing control routine in an HV mode.

As shown in FIG. 3, the temperature increasing control routine in the HV mode is a sub routine that is performed at 104 in the travelling-mode switching routine. According to the present embodiment, the temperature increasing control routine in the HV mode corresponds to the control portion. At 201, the hybrid ECU 20 determines whether the temperature of the ATF is less than a second predetermined value T1. According to the present embodiment, the second predetermined value T1 may be 60 degrees Celsius.

When the hybrid ECU 20 determines that the temperature of the ATF is less than the second predetermined value T1 at 201, the hybrid ECU 20 determines that the request of the warming-up of the transmission 13 is generated.

At 202, the hybrid ECU 20 calculates the request driving force of the vehicle by a map or a formula, based on the accelerator opening degree and the vehicle speed or based on the accelerator opening degree and the input rotational speed of the transmission 13.

At 203, the hybrid ECU 20 calculates a power ratio of the MG 12 to the engine 11 based on the operation state of the vehicle, and calculates a request driving force of the engine 11 and a request driving force of the MG 12. In this case, the operation state of the vehicle includes the request driving force of the vehicle and the battery SOC.

At 204, the hybrid ECU 20 determines whether the battery SOC is greater than or equal to a specified value. When the hybrid ECU 20 determines that the battery SOC is less than the specified value, the hybrid ECU 20 proceeds to 205. At 205, the hybrid ECU 20 calculates the target input rotational speed of the transmission 13 based on the request driving force of the MG 12, such that the heat loss quantity of the MG 12 becomes maximum.

Specifically, the hybrid ECU 20 calculates the target input rotational speed according to the request driving force of the MG 12 based on a first map of the target input rotational speed in the temperature increasing control in the HV mode. The first map is established by setting the target input rotational speed according to the request driving force of the MG 12 in the HV mode based on test data or design data, and is stored in a ROM of the hybrid ECU 20. The test data may be previously obtained by thermal analysis simulation.

When the hybrid ECU 20 determines that the battery SOC is greater than or equal to the specified value at 204, the hybrid ECU 20 proceeds to 206. At 206, the hybrid ECU 20 calculates the target input rotational speed of the transmission 13 based on the request driving force of the MG 12, such that the heat loss quantity of the MG 12 is not maximum. In this case, the heat loss quantity of the MG 12 is less than the maximum of the heat loss quantity of the MG 12.

Specifically, the hybrid ECU 20 calculates the target input rotational speed according to the request driving force of the MG 12 based on a second map of the target input rotational speed in the temperature increasing control in the HV mode. The second map is established by setting the target input rotational speed according to the request driving force of the MG 12 in the HV mode based on test data or design data, and is stored in the ROM of the hybrid ECU 20. In addition, the heat loss quantity of the MG 12 is less than the maximum of the heat loss quantity.

At 207, the hybrid ECU 20 calculates a request torque of the MG 12 based on the request driving force of the MG 12 and the target input rotational speed. Specifically, the hybrid ECU 20 calculates the request torque of the MG 12 by dividing the request driving force of the MG 12 by the target input rotational speed. At 208, the hybrid ECU 20 controls the MG 12 by using the MG-ECU 22 such that a torque of the MG 12 becomes the request torque of the MG 12.

At 209, the hybrid ECU 20 calculates a request torque of the engine 11 based on the request driving force of the engine 11 and the target input rotational speed. Specifically, the hybrid ECU 20 calculates the request torque by dividing the request driving force of the engine 11 by the target input rotational speed. At 210, the hybrid ECU 20 controls the engine 11 by using the engine ECU 21 such that a torque of the engine 11 becomes the request torque of the engine 11.

At 211, the hybrid ECU 20 calculates a target transmission ratio of the transmission 13 based on an output rotational speed of the transmission 13 and the target input rotational speed. Specifically, the hybrid ECU 20 calculates the target transmission ratio of the transmission 13 by dividing the target input rotational speed by the output rotational speed. In addition, the output rotational speed may be replaced by the vehicle speed. At 212, the hybrid ECU 20 controls the transmission 13 by using the transmission ECU 23 such that a transmission ratio of the transmission 13 becomes the target transmission ratio.

The hybrid ECU 20 performs processing in 207 to 212 to control the torque of the MG 12, the torque of the engine 11, and the transmission ratio of the transmission 13, so as to achieve the target input rotational speed. According to the present embodiment, to achieve the target input rotational speed, the input rotational speed of the transmission 13 becomes the target input rotational speed.

When the hybrid ECU 20 determines that the temperature of the ATF is greater than or equal to the second predetermined value T1 at 201, the hybrid ECU 20 proceeds to 213. At 213, the hybrid ECU 20 executes a normal control in the HV mode. In the normal control in the HV mode, the hybrid ECU 20 sets the target input rotational speed where a total efficiency including an efficiency of the engine 11 and an efficiency of the MG 12 becomes maximum, and controls the engine 11, the MG 12, and the transmission 13 so as to achieve the target input rotational speed. In addition, the total efficiency may include the efficiency of the engine 11, the efficiency of the MG 12, and an efficiency of the transmission 13. Alternatively, the hybrid ECU 20 sets the target input rotational speed such that the efficiency of the engine 11 becomes maximum, and then controls the engine 11, the MG 12, and the transmission 13 to achieve the target input rotational speed.

Figure 4:
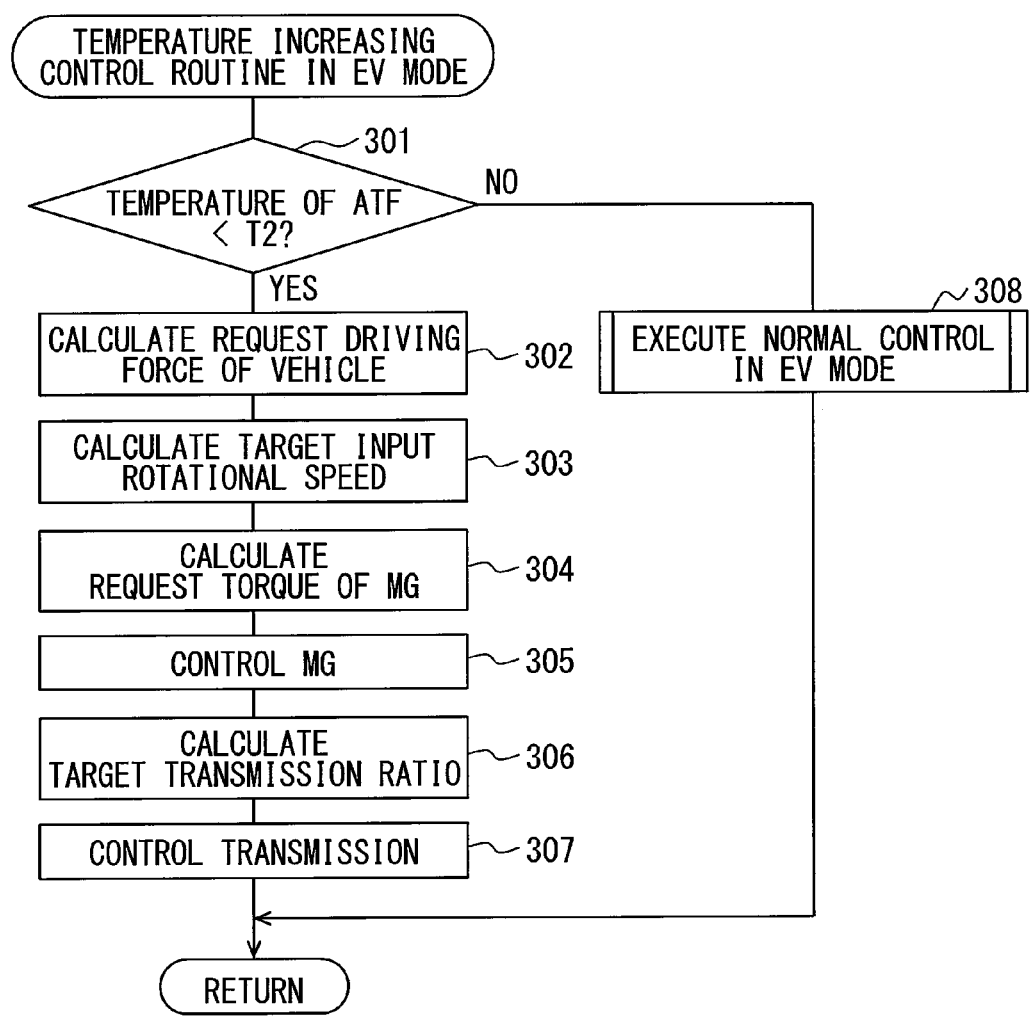
FIG. 4 is a flowchart showing the temperature increasing control routine in an EV mode.

As shown in FIG. 4, the temperature increasing control routine in the EV mode is a sub routine that is performed at 106 in the travelling-mode switching routine. According to the present embodiment, the temperature increasing control routine in the EV mode corresponds to the control portion. At 301, the hybrid ECU 20 determines whether the temperature of the ATF is less than a third predetermined value T2. According to the present embodiment, the third predetermined value T2 may be 80 degrees Celsius. Further, the first predetermined value T0 is set to be less than the second predetermined value T1 and the third predetermined value T2.

When the hybrid ECU 20 determines that the temperature of the ATF is less than the third predetermined value T2 at 301, the hybrid ECU 20 determines that the request of the warming-up of the transmission 13 is generated.

At 302, the hybrid ECU 20 calculates the request driving force of the vehicle by a map or a formula, based on the accelerator opening degree and the vehicle speed or based on the accelerator opening degree and the input rotational speed of the transmission 13.

At 303, the hybrid ECU 20 calculates the target input rotational speed of the transmission 13 based on the request driving force of the MG 12, such that the heat loss quantity of the MG 12 becomes maximum. In this case, the request driving force of the MG 12 is equal to the request driving force of the vehicle.

Specifically, the hybrid ECU 20 calculates the target input rotational speed according to the request driving force of the MG 12 based on a map of the target input rotational speed in the temperature increasing control in the EV mode. The map is established by setting the target input rotational speed according to the request driving force of the MG 12 in the EV mode based on test data or design data, and is stored in the ROM of the hybrid ECU 20.

At 304, the hybrid ECU 20 calculates the request torque of the MG 12 based on the request driving force of the MG 12 and the target input rotational speed. Specifically, the hybrid ECU 20 calculates the request torque of the MG 12 by dividing the request driving force of the MG 12 by the target input rotational speed. At 305, the hybrid ECU 20 controls the MG 12 by using the MG-ECU 22 such that the torque of the MG 12 becomes the request torque of the MG 12.

At 306, the hybrid ECU 20 calculates the target transmission ratio of the transmission 13 based on the output rotational speed of the transmission 13 and the target input rotational speed. Specifically, the hybrid ECU 20 calculates the target transmission ratio of the transmission 13 by dividing the target input rotational speed by the output rotational speed. In addition, the output rotational speed may be replaced by the vehicle speed. At 307, the hybrid ECU 20 controls the transmission 13 by using the transmission ECU 23 such that the transmission ratio of the transmission 13 becomes the target transmission ratio.

The hybrid ECU 20 performs processing in 304 to 307 to control the torque of the MG 12 and the transmission ratio of the transmission 13, so as to achieve the target input rotational speed.

When the hybrid ECU 20 determines that the temperature of the ATF is greater than or equal to the third predetermined value T2 at 301, the hybrid ECU 20 proceeds to 308. At 308, the hybrid ECU 20 executes a normal control in the EV mode. In the normal control in the EV mode, the hybrid ECU 20 sets the target input rotational speed where a total efficiency including an efficiency of the MG 12 becomes maximum, and controls the MG 12 and the transmission 13 so as to achieve the target input rotational speed. In addition, the total efficiency may include the efficiency of the MG 12 and an efficiency of the transmission 13.

Referring to FIG. 5, an example of executing the temperature increasing control according to the present embodiment will be described.

The hybrid ECU 20 calculates the request driving force of the vehicle based on the accelerator opening degree, and switches the travelling mode of the vehicle between the HV mode and the EV mode according to the request driving force of the vehicle and the battery SOC.

When the temperature of the ATF is less than the second predetermined value T1 in the HV mode, the hybrid ECU 20 executes the temperature increasing control in the HV mode. In the temperature increasing control in the HV mode, the hybrid ECU 20 can set the target input rotational speed where the heat loss quantity of the MG 12 becomes maximum, based on the request driving force of the MG 12 calculated from the request driving force of the vehicle. Therefore, the hybrid ECU 20 can set the target input rotational speed where the heat loss quantity becomes maximum, and the hybrid ECU 20 controls the engine 11, the MG 12, and the transmission 13 to output power that meets the request driving force of the vehicle. Since the hybrid ECU 20 controls the MG 12, the engine 11, and the transmission 13 to achieve the target input rotational speed, the hybrid ECU 20 can control the MG 12, the engine 11, and the transmission 13 in the condition that the heat loss quantity becomes maximum. Therefore, the temperature of the ATF can be efficiently increased, and an acceleration of the increasing of the temperature of the ATF and a deterioration of fuel consumption can be balanced. When the battery SOC is greater than or equal to the specified value, the hybrid ECU 20 sets the target input rotational speed where the heat loss quantity is less than the maximum of the heat loss quantity.

Then, the hybrid ECU 20 switches the travelling mode of the vehicle to the EV mode at a time point t1 that the request driving force of the vehicle is decreased to be in the EV mode area. When the temperature of the ATF is less than the third predetermined value T2 in the EV mode, the hybrid ECU 20 executes the temperature increasing control in the EV mode. In the temperature increasing control in the EV mode, the hybrid ECU 20 sets the target input rotational speed of the transmission 13 where the heat loss quantity becomes maximum based on the request driving force of the MG 12. Therefore, the hybrid ECU 20 can set the target input rotational speed where the heat loss quantity becomes maximum, and the hybrid ECU 20 controls the MG 12 and the transmission 13 to output power that meets the request driving force of the vehicle. Since the hybrid ECU 20 controls the MG 12 and the transmission 13 to achieve the target input rotational speed, the hybrid ECU 20 can control the MG 12 and the transmission 13 in the condition that the heat loss quantity becomes maximum. Therefore, the temperature of the ATF can be further efficiently increased, and the acceleration of the increasing of the temperature of the ATF and the deterioration of the fuel consumption can be balanced.

Then, the hybrid ECU 20 terminates the temperature increasing control in the EV mode and executes the normal control in the EV mode, at a time point t2 that the temperature of the ATF becomes a value greater than or equal to the third predetermined value T2. In the normal control in the EV mode, the hybrid ECU 20 sets the target input rotational speed such that the efficiency of the MG 12 becomes maximum, and controls the MG 12 and the transmission 13 to achieve the target input rotational speed. Further, the hybrid ECU 20 sets the target input rotational speed such that the total efficiency including the efficiency of the engine 11 and the efficiency of the MG 12 becomes maximum, and controls the engine 11, the MG 12, and the transmission 13 to achieve the target input rotational speed.

When the temperature of the ATF is less than the second predetermined value T1, the hybrid ECU 20 executes the temperature increasing control in the HV mode or in the EV mode at a time point t3, so as to efficiently increase the temperature of the ATF.

When the battery SOC is higher, a ratio of the driving force of the MG 12 to the driving force of the vehicle is larger. Therefore, it is a tendency that the driving force of the MG 12 becomes larger. Since a heat generation of the MG 12 increases when the driving force of the MG 12 becomes larger, the temperature of the ATF can be sufficiently increased even though the heat loss quantity is less than the maximum of the heat loss quantity.

According to the present embodiment, when the battery SOC is greater than or equal to the specified value, the hybrid ECU 20 sets the target input rotational speed such that the heat loss quantity is less than the maximum of the heat loss quantity. Therefore, when the battery SOC is greater than or equal to the specified value and the driving force of the MG 12 becomes greater, the heat loss quantity can be properly decreased, the efficiency of the MG 12 can be properly increased, and the fuel consumption can be improved. According to the present embodiment, when the temperature of the ATF is less than the first predetermined value T0, the hybrid ECU 20 changes the determination condition of switching the travelling mode of the vehicle between the HV mode and the EV mode to expand the EV mode area. Therefore, when the temperature of the ATF is low, the hybrid ECU 20 expands the EV mode area, and a frequency and period of the vehicle travelling by only using the power of the MG 12 can be increased. Thus, a frequency and period of increasing the driving force of the MG 12 and the heat generation of the MG 12 can be increased, and the acceleration of the increasing of the temperature of the ATF can be improved.

According to the present embodiment, the first map of the target input rotational speed is previously stored, and the hybrid ECU 20 calculates the target input rotational speed where the heat loss quantity becomes maximum by using the first map. Therefore, the target input rotational speed where the heat loss quantity becomes maximum can be readily calculated by a simple calculation using the first map, and a calculation load of the hybrid ECU 20 can be reduced.

According to the present embodiment, since the hybrid ECU 20 switches between the temperature increasing control and the normal control according the temperature of the ATF, the hybrid ECU 20 can properly regulate the temperature of the ATF. Therefore, a deterioration of elements can be suppressed, and a security of elements can be improved.

Even when the engine 11 is turned on and off frequently in a hybrid vehicle that can be charged from an external power source such as a plug-in hybrid vehicle, the temperature of the ATF can be surely increased, and the fuel consumption can be improved.

According to the present embodiment, the hybrid ECU 20 sets the target input rotational speed where the heat loss quantity becomes maximum, based on the request driving force of the MG 12. However, the hybrid ECU 20 may set the target input rotational speed where the heat loss quantity becomes maximum, based on the request driving force of the vehicle.

Alternatively, the hybrid ECU 20 may set the target input rotational speed where the heat loss quantity becomes maximum, based on a ratio of the power of the engine 11 to the power of the MG 12. In this case, the heat loss quantity is calculated based on the heat loss quantity of the MG 12 and the heat loss quantity of the transmission 13. Thus, in the entire vehicle, a heat energy can be accurately efficiently used.

According to the present embodiment, the present disclosure is applied to a system provided with a CVT as the transmission 13. However, the present disclosure may be applied to a system provided with a stepped transmission that switches a transmission stage among plural transmission stages. Further, the present disclosure may be applied to a system in which the clutch 17 is placed at a position between the engine 11 and the MG 12 and another clutch is placed at a position between the MG 12 and the transmission 13.

According to the present embodiment, the heat exchange between the lubricating oil of the transmission and the motor is executed. However, the heat exchange may also be executed between the lubricating oil of the transmission and other heat-generating device such as a battery or an inverter.

The present disclosure is not limited to the hybrid vehicle as shown in FIG. 1. The present disclosure can be applied to any hybrid vehicle in which an engine and a motor are provided as power sources of the hybrid vehicle and a heat exchange between a lubricating oil of a transmission and the motor is executed. For example, the present disclosure may be applied to a hybrid vehicle in which plural motors are provided in a power transmission system transferring a power of an engine to a wheel, or a hybrid vehicle in which an engine and plural motors are connected to each other through a power dividing mechanism such as a planetary gear mechanism.

The present disclosure is not limited to the hybrid vehicle in which both the engine and the motor are used as power sources. The present disclosure may be applied to an electric vehicle in which only a motor is used as a power source.

While the present disclosure has been described with reference to the embodiments thereof, it is to be understood that the disclosure is not limited to the embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A vehicle control system comprising:
   a motor mounted to a vehicle;
   a battery mounted to the vehicle, wherein an electric power is configured to transfer between the motor and the battery,
   a transmission mounted to the vehicle; and
   a controller configured to set a target input rotational speed of the transmission based on a requested driving force of the vehicle when a request to warm-up the transmission is generated, and the controller is configured to control the motor and the transmission to obtain an input rotational speed of the transmission equal to the target input rotational speed, which maximizes a heat exchange from the motor to a lubricating oil of the transmission that increases a temperature of the lubricating oil, and configured to set the target input rotational speed such that the heat exchange is less than the maximum when a state of charge in the battery is greater than or equal to a specified value.

2. The vehicle control system according to claim 1, further comprising:
an engine mounted to the vehicle, wherein
both the motor and the engine are used as power sources of the vehicle, and
the controller is configured to control the motor, the engine, and the transmission to obtain the input rotational speed of the transmission equal to the target input rotational speed.

3. The vehicle control system according to claim 2, wherein
the controller is configured to switch a travelling mode of the vehicle between a HV mode and an EV mode, in the HV mode, the vehicle travels at least by using a power of the engine between the power of the engine and a power of the motor, in the EV mode, the vehicle travels by using the power of the motor, and the controller is configured to change a determination condition of switching the travelling mode of the vehicle between the HV mode and the EV mode to expand an EV mode area, when the temperature of the lubricating oil is less than a predetermined value.

* * * * *